(12) United States Patent
Barrett

(10) Patent No.: US 7,376,908 B2
(45) Date of Patent: May 20, 2008

(54) ON-SCREEN DISPLAY IMAGE RENDERED WITH MPEG HARDWARE

(75) Inventor: Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 10/395,756

(22) Filed: Mar. 24, 2003

(65) Prior Publication Data

US 2004/0189689 A1  Sep. 30, 2004

(51) Int. Cl.
*G06F 3/048* (2006.01)
*G06F 3/00* (2006.01)

(52) U.S. Cl. .................. 715/767; 715/719; 715/762

(58) Field of Classification Search ............. 345/719; 715/719, 762, 725
See application file for complete search history.

(56) References Cited

U.S. PATENT DOCUMENTS

| | | | |
|---|---|---|---|
| 6,128,009 A * | 10/2000 | Ohkura et al. ............ 725/46 |
| 6,229,524 B1 | 5/2001 | Chernock et al. |
| 6,369,826 B1 | 4/2002 | Shimotono et al. |
| 6,396,473 B1 | 5/2002 | Callahan et al. |
| 6,501,441 B1 * | 12/2002 | Ludtke et al. ............ 345/1.1 |
| 6,593,937 B2 * | 7/2003 | Ludtke et al. ............ 345/629 |
| 6,642,939 B1 * | 11/2003 | Vallone et al. ............ 715/721 |
| 6,922,485 B2 * | 7/2005 | Hirata .................... 382/164 |
| 6,975,324 B1 * | 12/2005 | Valmiki et al. ............ 345/555 |
| 6,999,105 B2 * | 2/2006 | Buerkle et al. ............ 345/660 |
| 7,019,750 B2 * | 3/2006 | Sakaguchi ............... 345/475 |
| 7,030,890 B1 * | 4/2006 | Jouet et al. .............. 345/619 |
| 7,054,870 B2 * | 5/2006 | Holbrook ................. 707/10 |
| 7,075,557 B2 * | 7/2006 | Ludtke et al. ............ 345/629 |
| 7,099,561 B1 * | 8/2006 | Lin et al. ................. 386/95 |
| 7,103,840 B2 * | 9/2006 | Ihara et al. .............. 715/726 |
| 2003/0142087 A1 * | 7/2003 | Shiotsu et al. ............ 345/211 |
| 2005/0022134 A1 * | 1/2005 | Tokashiki ................ 715/764 |

OTHER PUBLICATIONS

Andrew S. Tanenbaum, Structured Computer Organization, 1984, Second Edition, pp. 10-12.*
Tokmakoff, Andrew et al., "Home Media Server content management", 2001 SPIE, vol. 4519, pp. 168-179.
Chen, C.T. et al., "A Single-Chip MPEG-2 MP@ML Audio/Video Encoder/Decoder with a Programmable Video Interface Unit", 2001 IEEE, pp. 941-944, ii.

* cited by examiner

*Primary Examiner*—Weilun Lo
*Assistant Examiner*—David Phantana-angkool

(57) ABSTRACT

In an implementation of on-screen display image rendered with MPEG hardware, image data corresponding to an image and formatted for on-screen display is received. MPEG frames are generated from the on-screen display image data and the MPEG frames are decoded to generate the image for display as an MPEG image. For example, a graphical user interface can be generated for display as the MPEG image. Further, additional on-screen display image data can be processed to generate an on-screen image for display over the MPEG image. For example, an on-screen image, such as text or a graphic, can be generated for display over the graphical user interface.

40 Claims, 6 Drawing Sheets

ON-SCREEN DISPLAY IMAGE RENDERED WITH MPEG HARDWARE

TECHNICAL FIELD

This invention relates to image processing and, in particular, to an on-screen display image rendered with MPEG hardware.

BACKGROUND

A limited resource client device in a television-based system, such as a set-top box without a graphics accelerator, can receive on-screen display image data and process the image data with a central processing unit to display the image as an on-screen display. For example, the client device can render a user interface with conventional four-bit on-screen display processing which will slowly render the user interface with limited color and graphic rendition.

A conventional client device also includes an MPEG hardware decoder to receive and process digital video which is rendered in a digital video plane. Digital video is processed as a sixteen-bit, true color rendition and generates an image for display much faster than an image rendered as an on-screen display. Further, an on-screen display image can be processed for display such that the on-screen image is displayed over a digital video on a display device. A conventional client device also includes a tuner that, when tuned to an analog channel, receives analog video content which is processed for display on an analog plane.

For a client device, such as a set-top box in a television-based system, there is a need to be able to generate an image formatted for display as on on-screen display image with component(s) of the client device other than with a central processing unit.

SUMMARY

On-screen display image rendered with MPEG hardware is described herein.

In an implementation, image data corresponding to an image and formatted for on-screen display is received. MPEG frames are generated from the on-screen display image data and the MPEG frames are decoded to generate the image for display as an MPEG image. For example, a graphical user interface can be generated for display as the MPEG image.

In another implementation, additional on-screen display image data is processed to generate an on-screen image for display over the MPEG image. For example, an on-screen image, such as text or a graphic, can be generated for display over the graphical user interface.

In another implementation, a graphical user interface generated for display as the MPEG image can have an inset in which a displayed image can be scrolled. The MPEG image data is further decoded to scroll the image in the inset of the graphical user interface.

BRIEF DESCRIPTION OF THE DRAWINGS

The same numbers are used throughout the drawings to reference like features and components.

DETAILED DESCRIPTION

In an implementation of on-screen display image rendered with MPEG hardware, image data corresponding to an image and formatted for on-screen display is received. MPEG frames are generated from the on-screen display image data and the MPEG frames are decoded to generate the image for display as an MPEG image. For example, a graphical user interface can be generated for display as the MPEG image. Further, additional on-screen display image data can be processed to generate an on-screen image for display over the MPEG image. For example, an on-screen image, such as text or a graphic, can be generated for display over the graphical user interface.

The inventive techniques described herein utilize an existing MPEG video decoder in a low-end, limited resource client device to implement graphics accelerator functions which enables the client device to render any type of images on a displayable digital graphics plane. For example, a graphical user interface having graphical user interface elements, such as selectable controls, menus, buttons, check boxes, and the like, are compressed as MPEG image data. The MPEG image data corresponding to the graphical user interface and to the user interface elements is composed into a display list which is decoded to render the graphical user interface and the user interface elements as an MPEG image.

The following discussion is directed to television-based entertainment and information systems, such as interactive television networks, cable networks, and Web-enabled television networks. Client devices in such systems range from full-resource clients with substantial memory and processing resources, such as television-enabled personal computers and television recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Figure 1:
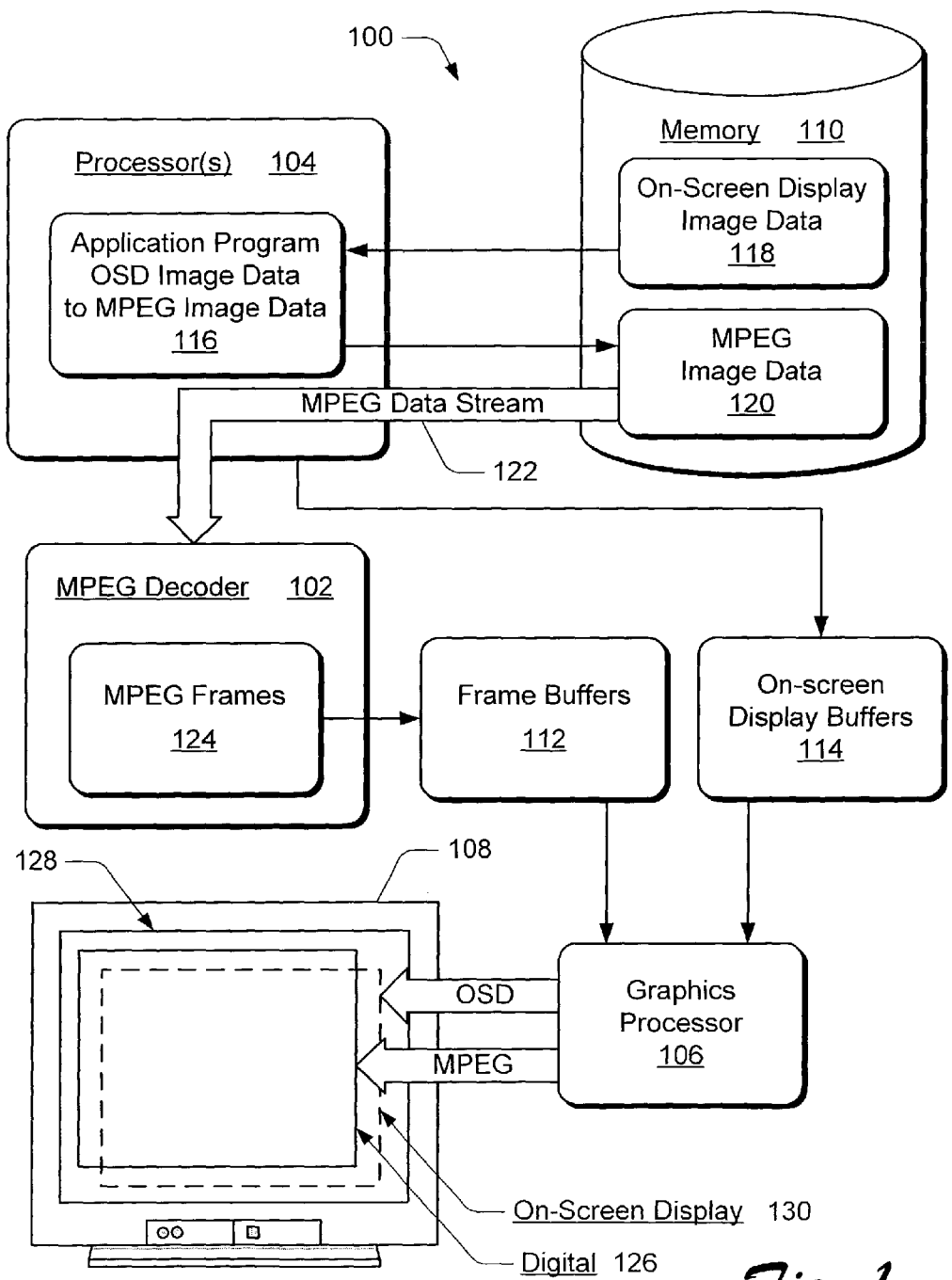
FIG. 1 illustrates various components of an exemplary system to implement on-screen display image rendered with MPEG hardware.

FIG. 1 illustrates various components of an exemplary MPEG data processing system 100 to implement on-screen display image rendered with MPEG hardware. System 100 includes an MPEG decoder 102, one or more processors 104, a graphics processor 106, and a display device 108. System 100 also includes a memory device 110, frame buffers 112, and on-screen display buffers 114. The illustrated components of system 100 can be implemented in any number of television-based client devices, such as a set-top box, a satellite receiver, a TV recorder with a hard disk, a digital video recorder (DVR) and playback system, a personal video recorder (PVR) and playback system, a game console, an information appliance, and so forth.

An application program 116 receives image data 118 formatted for on-screen display which is maintained by memory device 110 and generates MPEG image data 120 which can also be stored and maintained by memory device 110. A process by which application program 116 generates MPEG image data 120 from the on-screen display image data 118 is described below with reference to FIG. 3. Although application program 116 is illustrated and described as a single application configured to generate MPEG image data from on-screen display image data, the application program 116 can be implemented as several component applications distributed to each perform one or more functions in a digital video recorder system, a personal video recorder system, and/or any other television-based client device in an entertainment and information system.

The MPEG decoder 102 receives the MPEG image data 120 as an MPEG data stream 122 and decodes the MPEG image data to generate MPEG frames 124 which are stored in frame buffers 112 for display on display device 108. In this example, the MPEG image data 120 includes I-frames and P-frames which represent an MPEG image, such as a graphical user interface for example. The MPEG I-frames (intra frames) are each coded as a stand-alone still image and the MPEG P-frames (predicted frames) are each coded relative to the nearest previous I-frame or P-frame for forward prediction processing. The MPEG image data 120 may also include B-frames (bi-directional frames) which each use the closest past and future I-frame or P-frame as a reference for bi-directional prediction.

The MPEG frames are divided into 16×16 macroblocks for encoding. Macroblocks in the P-frames can be encoded as directly displayable pixel values, or as a delta (e.g., prediction) that is applied to a 16×16 macroblock region from a previously decoded frame. The resultant of a prediction from a previously decoded frame is designated by a two-dimensional motion vector that is encoded with a macroblock. A motion vector of (0,0) in a macroblock refers to a 16×16 region in the same position of a previous frame.

Processor(s) 104 process and communicate additional on-screen display image data, which can also be maintained with memory device 110, to the on-screen display buffers 114. Graphics processor 106 receives both the MPEG frames 112 from the frame buffers 112 and the on-screen display image data from the on-screen display buffers 114. The graphics processor 106 processes the MPEG frames 124 for display as a digital MPEG image 126 in a display region 128 of display device 108. The graphics processor 106 also processes the on-screen display image data for display as an on-screen image 130 over the digital MPEG image 126 in display region 128 of display device 108.

This data processing system 100 utilizes an existing video decoder (e.g., MPEG decoder 102) in a low-end, limited resource set-top box to implement graphics accelerator functions which enables the set-top box to render any type of images on a displayable digital graphics plane. Application program 116 generates MPEG formatted image data that can be decoded with MPEG decoder 102 to render an image otherwise formatted for on-screen display.

Figure 2:
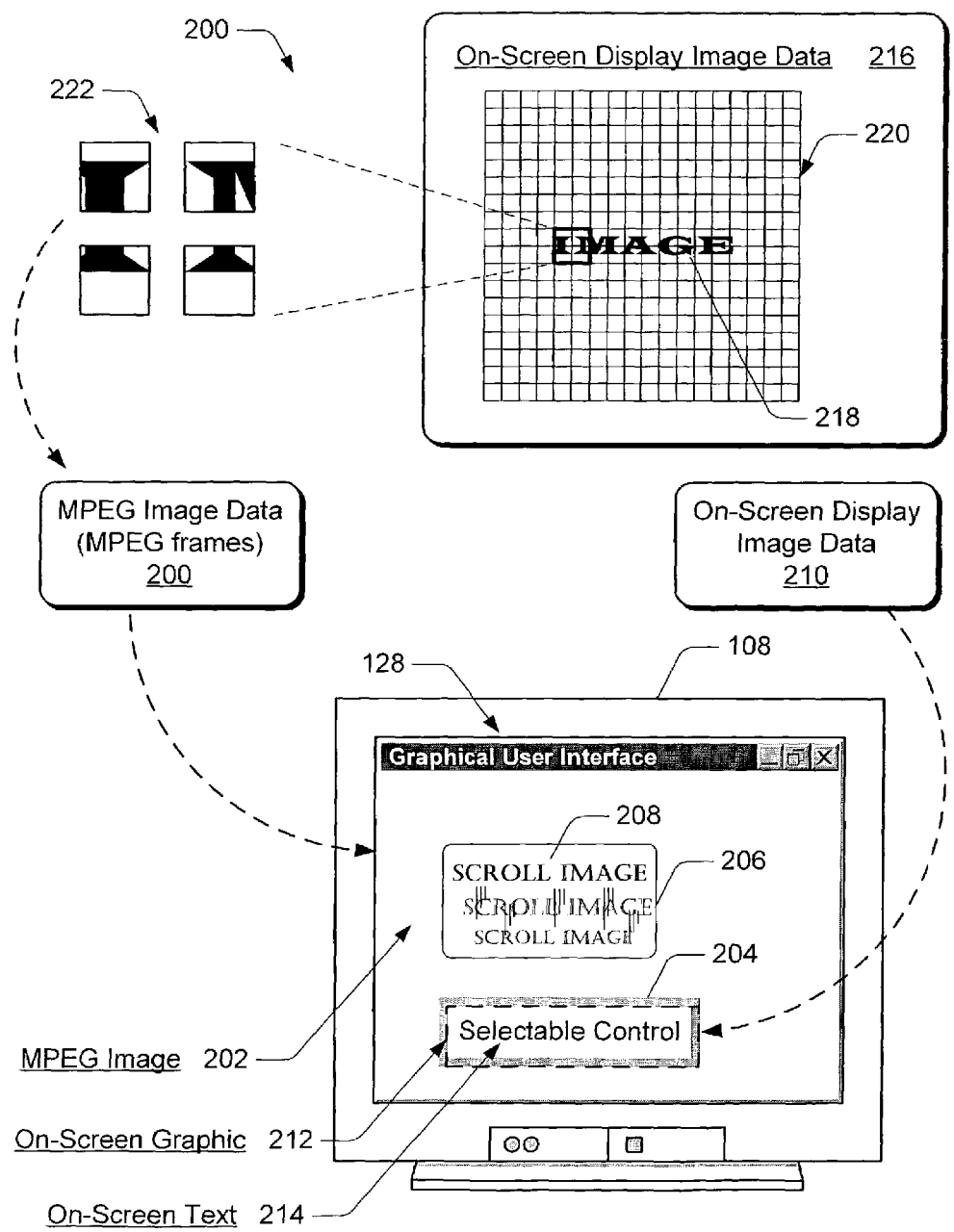
FIG. 2 illustrates an example of an on-screen display image rendered with MPEG hardware.

FIG. 2 illustrates an example of an on-screen display image rendered with MPEG hardware as described with reference to FIG. 1. An example of MPEG image data 200 (e.g., MPEG frames) generated by application program 116 (FIG. 1) is decoded to generate an MPEG image 202 which is illustrated as a graphical user interface in display region 128 of display device 108 (FIG. 1). The graphical user interface 202 includes a selectable control 204 and an inset 206 which displays a scrollable image 208 within the graphical user interface 202. Although only one selectable control 204 and one inset 206 is displayed, the graphical user interface 202 can include any number of insets and any number and combination of selectable controls, such as buttons, switches, menus, check boxes, and the like. Multiple selectable controls on a graphical user interface can be selected with user input devices, such as a pointing device (e.g., mouse or stylus) or keyboard (e.g., tab key).

On-screen display image data 210 is processed to display an on-screen graphic 212 and on-screen text 214 in the on-screen plane 130 (FIG. 1) over the MPEG image 202 in the digital plane. The on-screen graphic 212 is illustrated to hi-lite selectable control 204 as a user-selectable region of the graphical user interface 202, and the on-screen text 214 is illustrated as a text label for the selectable control 204. Any number and combination of text and graphics can be processed, or otherwise generated, for display over the graphical user interface 202. An on-screen image can be displayed over the graphical user interface to indicate, or otherwise hi-lite, a user-selectable region of the graphical user interface.

The MPEG image data 200 includes I-frames and P-frames. The I-frames are a stand-alone image of the graphical user interface 202 (e.g., MPEG image) that has been generated from on-screen display image data 216. The application program 116 (FIG. 1) partitions an image 218 represented by the on-screen display image data 216 within a 16×16 grid 220 to generate individual graphic elements 222, each corresponding to a block within grid 220. Each individual graphic element 222 is encoded as one or more MPEG intra-macroblocks which are combined to form MPEG image data 200 (e.g., MPEG frames). The MPEG data can be a variable length sequence of data bits that corresponds to a compressed version of an individual graphic element 222. The MPEG image data includes an MPEG frame header as well as the MPEG data corresponding to a section of the original image 218 and bit sequences corresponding to macroblocks that do not include MPEG data corresponding to a section of the original image 218 (e.g., skipped macroblocks).

An I-frame corresponding to the graphical user interface 202 is periodically repeated within an MPEG data stream of the MPEG image data 200. Because the graphical user interface 202 is static, the P-frames include null macroblocks with a motion vector of zero (0,0) and a delta value of zero because the display is not updated as with a moving display in a video. However, the image portion 208 of the graphical user interface 202 displayed within the inset 206 can be scrolled with P-frames that include motion vectors to scroll only the macroblocks that are combined to display image 208 within inset 206.

In this example, some of the P-frames in MPEG data 200 are encoded with motion vectors such that 16×16 macroblocks form the inset 206. The remaining 16×16 macroblocks that form the rest of the MPEG image 202 outside of the inset region are null macroblocks. Thus, when a P-frame is decoded, only the display image 208 within the inset 206 changes because the region outside of the inset 206 is null data and does not change. The remaining section of the MPEG image 202 is unchanged and continues to be displayed while the image 208 within inset 206 is being scrolled.

Methods for on-screen display image rendered with MPEG hardware may be described in the general context of computer-executable instructions. Generally, computer-executable instructions include routines, programs, objects, components, data structures, and the like that perform particular functions or implement particular abstract data types. The described methods may also be practiced in distributed computing environments where functions are performed by remote processing devices that are linked through a communications network. In a distributed computing environment, computer-executable instructions may be located in both local and remote computer storage media, including memory storage devices. The order in which a method is described is not intended to be construed as a limitation, and any number of the described method blocks in a method can be combined in any order to implement the method. Furthermore, the methods can be implemented in any suitable hardware, software, firmware, or combination thereof.

Figure 3:
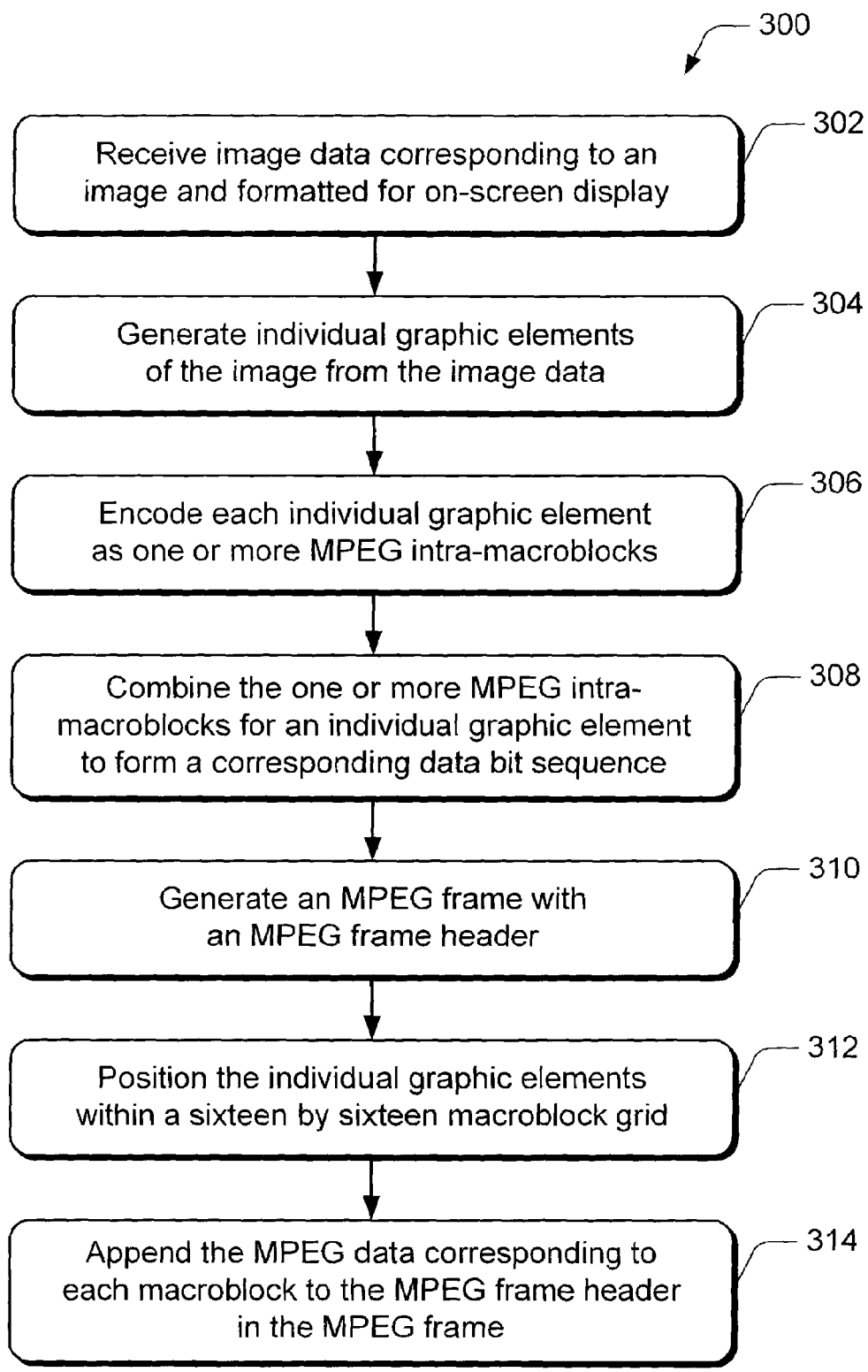
FIG. 3 is a flow diagram that illustrates an exemplary method to generate MPEG data from on-screen display image data.

FIG. 3 illustrates a method 300 to generate MPEG data from on-screen display image data. At block 302, image data corresponding to an image and formatted for on-screen display is received. At block 304, individual graphic elements of the image are generated from the image data. The individual graphic elements are generated, or otherwise created, by partitioning the image (e.g., the image data) within a 16×16 grid. For example, image 218 (FIG. 2) represented by the on-screen display image data 216 is partitioned within the 16×16 grid 220 to generate the individual graphic elements 222 which each correspond to a block within grid 220.

At block 306, each individual graphic element is encoded as one or more MPEG intra-macroblocks. At block 308, the one or more MPEG intra-macroblocks for an individual graphic element are combined to form a variable length sequence of data bits that corresponds to a compressed version of the individual graphic element. For example, application program 116 (FIG. 1) combines MPEG intra-macroblocks for a graphic element 222 (FIG. 2) to form MPEG image data 200.

At block 310, an MPEG frame is generated with an MPEG frame header. At block 312, the individual graphic elements are each positioned within a 16×16 macroblock grid. At block 314, the MPEG data corresponding to each macroblock is appended to the MPEG frame header in the MPEG frame. The MPEG data corresponding to a section of the original image, as well as bit sequences corresponding to macroblocks that do not include MPEG data corresponding to a section of the original image (e.g., skipped macroblocks), are interleaved and included in the MPEG frame.

Figure 4:
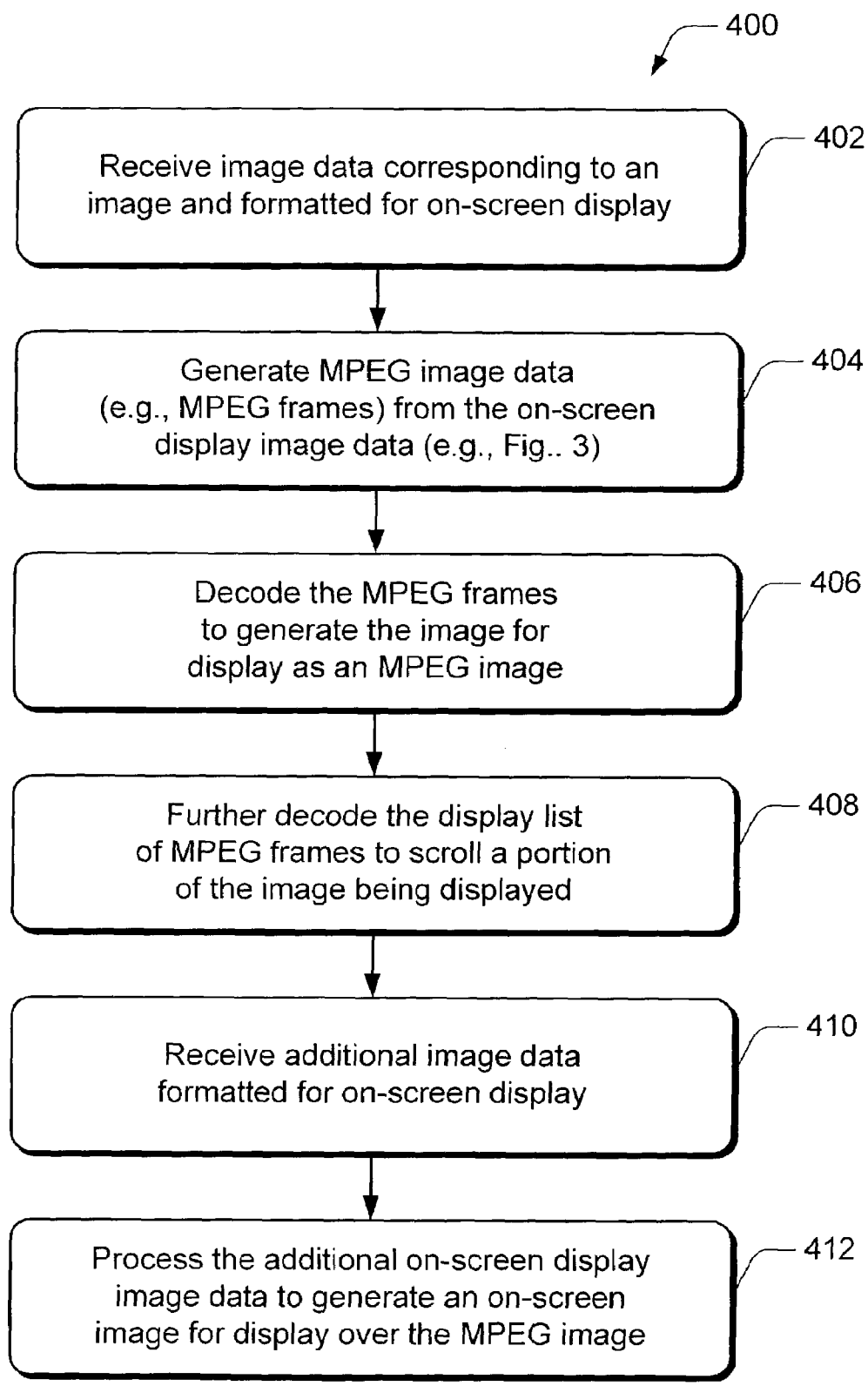
FIG. 4 is a flow diagram that illustrates an exemplary method for on-screen display image rendered with MPEG hardware.

FIG. 4 illustrates a method 400 for an on-screen display image rendered with MPEG hardware. At block 402, image data corresponding to an image and formatted for on-screen display is received. At block 404, MPEG frames are generated from the on-screen display image data. For example, application program 116 (FIG. 1) receives on-screen display image data 118 maintained with memory device 110, and generates MPEG image data 120 from the on-screen display image data as described with reference to FIG. 3. The MPEG image data 200 (FIG. 2) is also an example of MPEG image data (e.g., MPEG frames) generated from on-screen display image data 216.

At block 406, the MPEG frames are decoded to generate the image for display as an MPEG image. For example, MPEG image data 200 (FIG. 2) can be decoded to generate a graphical user interface as the MPEG image, such as graphical user interface 202. The graphical user interface 202 can include one or more selectable controls, such as selectable button 204, and can include one or more inset sections, such as inset 206.

At block 408, the MPEG frames are further decoded to scroll a portion of the image being displayed. For example, the MPEG image data 200 (FIG. 2) can be further decoded to scroll an image 208 displayed in inset 206.

At block 410, additional image data formatted for on-screen display is received. At block 412, the additional image data is processed to generate an on-screen image for display over the MPEG image. For example, an on-screen image can include an on-screen graphic 212 (FIG. 2) and/or on-screen text 214 which can be displayed over selectable control 204 on graphical user interface 202.

Figure 5:
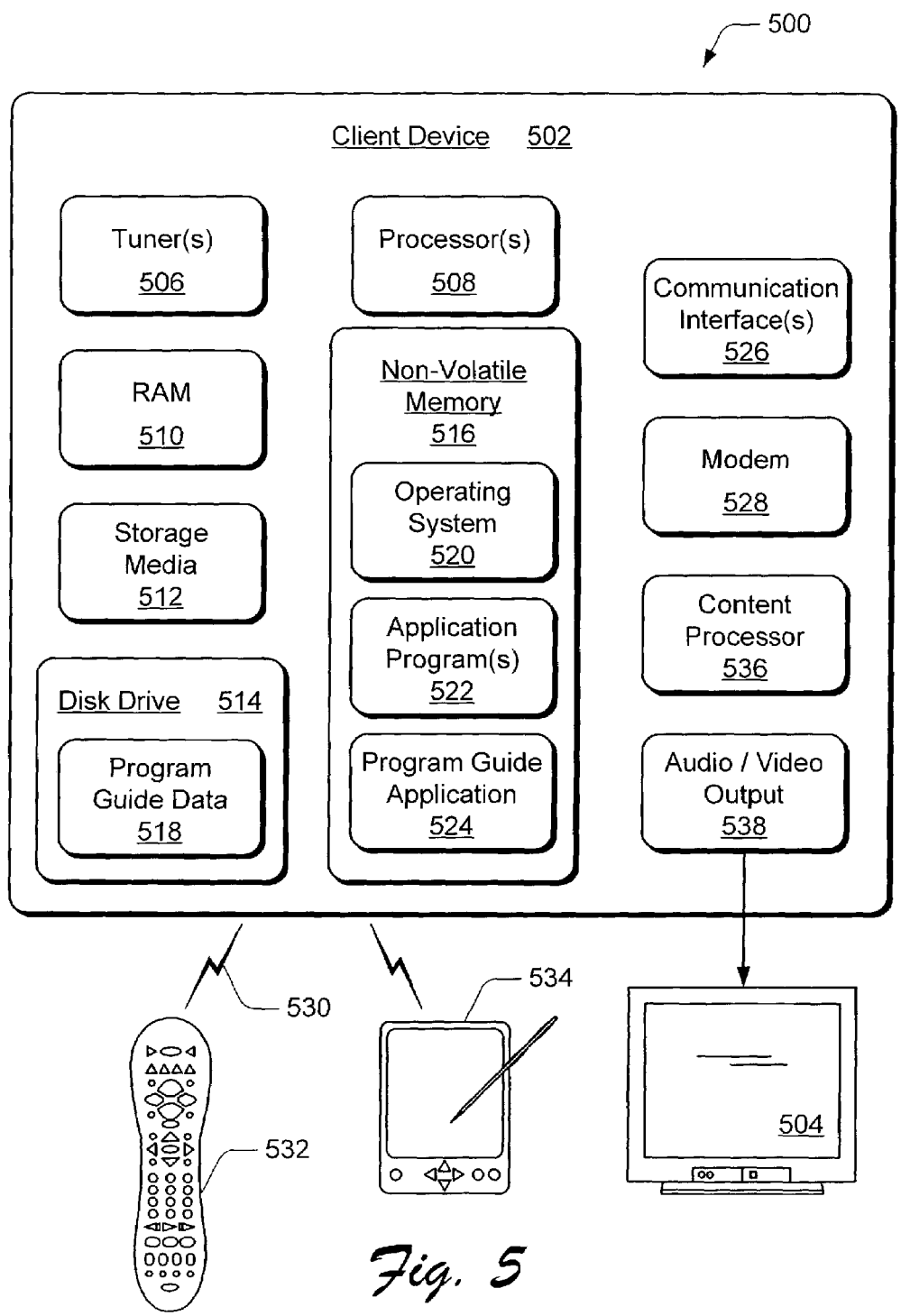
FIG. 5 illustrates various components of an exemplary client device implemented in a television-based system.

FIG. 5 illustrates a television-based system 500 that includes an exemplary client device 502 which includes components to implement on-screen display image rendered with MPEG hardware, such as the exemplary processing system 100 (FIG. 1). System 500 also includes a display device 504 to display the MPEG images and the on-screen display images that are generated for display. Client device 502 can be implemented as a set-top box, a satellite receiver, a TV recorder with a hard disk, a digital video recorder (DVR) and playback system, a personal video recorder (PVR) and playback system, a game console, an information appliance, and as any number of similar embodiments.

Client device 502 includes one or more tuners 506 which are representative of one or more in-band tuners that tune to various frequencies or channels to receive television signals, as well as an out-of-band tuner that tunes to the broadcast channel over which program data is broadcast to client device 502. Client device 502 also includes one or more processors 508 (e.g., microprocessors, controllers, and the like) which process various instructions to control the operation of client device 502 and to communicate with other electronic and computing devices.

Client device 502 can be implemented with one or more memory components, examples of which include a random access memory (RAM) 510, mass storage media 512, a disk drive 514, and a non-volatile memory 516 (e.g., ROM, Flash, EPROM, EEPROM, etc.). The one or more memory components store various information and/or data such as received content, program guide data 518, configuration information for client device 502, and/or graphical user interface information.

Alternative implementations of client device 502 can include a range of processing and memory capabilities, and may include any number and different memory components than those illustrated in FIG. 5. For example, full-resource clients can be implemented with substantial memory and processing resources, including the disk drive 514. Low-resource clients, however, may have limited processing and memory capabilities, such as a limited amount of RAM 510 and limited processing capabilities of a processor 508.

An operating system 520 and one or more application programs 522 can be stored in non-volatile memory 516 and executed on a processor 508 to provide a runtime environment. A runtime environment facilitates extensibility of client device 502 by allowing various interfaces to be defined that, in turn, allow application programs 522 to interact with client device 502. The application programs 522 can include a browser to browse the Web (e.g., "World Wide Web"), an email program to facilitate electronic mail, and any number of other application programs.

A program guide application 524 that executes on a processor 508 is also stored in non-volatile memory 516 and is implemented to process the program guide data 518 and generate a program guide for display. Program guide application 524 utilizes the program guide data 518 and enables a television viewer to navigate through an onscreen program guide and locate programs, video on-demand movies, interactive game selections, and other media access information or content of interest to the viewer. With program guide application 524, the television viewer can look at schedules of past, current, and future programming, set reminders for upcoming programs, and/or enter instructions to record one or more television shows or video on-demand movies.

Client device 502 further includes one or more communication interfaces 526 and a PSTN, DSL, or cable modem 528. A communication interface 526 can be implemented as a serial and/or parallel interface, as a wireless interface, and/or as any other type of network interface. A wireless interface enables client device 502 to receive control input commands 530 and other information from a user-operated input device, such as from a remote control device 532 or from another infrared (IR), 802.11, Bluetooth, or similar RF input device. Input devices can include a wireless keyboard or another handheld input device 534 such as a personal digital assistant (PDA), handheld computer, wireless phone, or the like. A network interface and a serial and/or parallel interface enables client device 502 to interact and communicate with other electronic and computing devices via various communication links. Modem 528 facilitates client device 502 communication with other electronic and computing devices via a conventional telephone line, a DSL connection, or a cable modem.

Client device 502 also includes a content processor 536 which can include a video decoder and/or additional processors to receive, process, and decode broadcast video signals and program data, such as NTSC, PAL, SECAM, or other television system analog video signals, as well as DVB, ATSC, or other television system digital video signals. For example, content processor 536 can include an MPEG-2 or MPEG-4 (Moving Pictures Experts Group) decoder that decodes MPEG-encoded video content and/or image data. The systems described herein can be implemented for any type of video encoding format as well as for data and/or content streams that are not encoded.

Typically, video content and program data includes video data and corresponding audio data. Content processor 536 generates video and/or display content that is formatted for display on display device 504, and generates decoded audio data that is formatted for presentation by a presentation device, such as one or more speakers (not shown) in display device 504. Content processor 536 can include a display controller (not shown) that processes the video and/or display content to display corresponding images on display device 504. A display controller can include a graphics processor, microcontroller, integrated circuit, and/or similar video processing component to process the images.

Client device 502 also includes an audio and/or video output 538 that provides the audio, video, and/or display signals to television 504 or to other devices that process and/or display, or otherwise render, the audio and video data. Video signals and audio signals can be communicated from client device 502 to television 504 via an RF (radio frequency) link, S-video link, composite video link, component video link, or other similar communication link.

Although shown separately, some of the components of client device 502 may be implemented in an application specific integrated circuit (ASIC). Additionally, a system bus (not shown) typically connects the various components within client device 502. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 6:
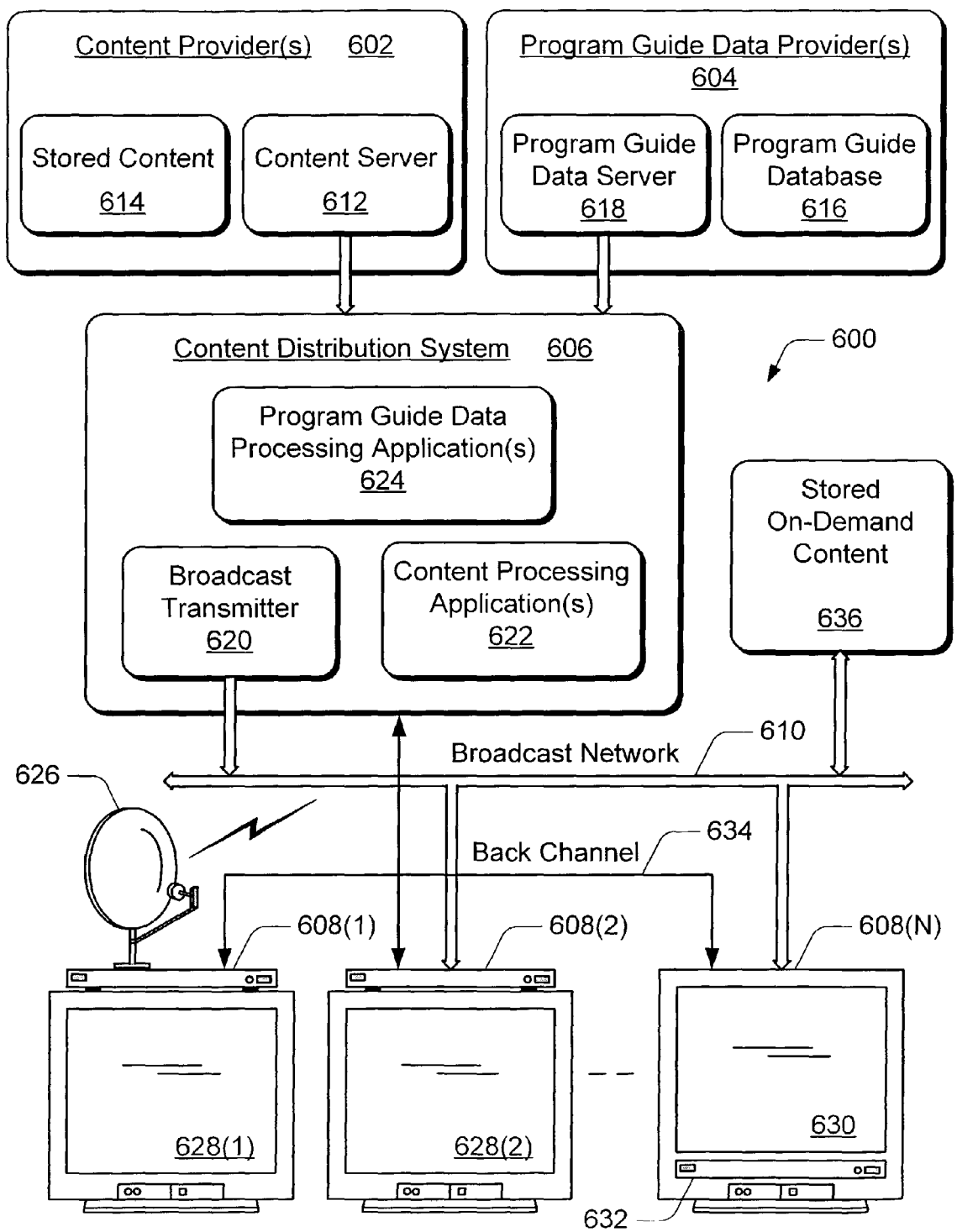
FIG. 6 illustrates an exemplary system architecture in which on-screen display image rendered with MPEG hardware can be implemented.

FIG. 6 illustrates an exemplary system architecture 600 in which on-screen display image rendered with MPEG hardware can be implemented. System 600 facilitates distribution of content and program guide data to multiple viewers. The system 600 includes one or more content providers 602, one or more program guide data providers 604, a content distribution system 606, and multiple client devices 608(1), 608(2), . . . , 608(N) coupled to the content distribution system 606 via a broadcast network 610.

A content provider 602 can be implemented as a satellite operator, a network television operator, a cable operator, and the like. A content provider 602 includes a content server 612 to control distribution of stored content 614, such as movies, television programs, commercials, music, and similar audio, video, and/or image content from content provider 602 to the content distribution system 606. Additionally, content server 612 controls distribution of live content (e.g., content that was not previously stored, such as live feeds) and/or content stored at other locations to the content distribution system 606. A program guide data provider 604 includes a program guide database 616 and a program guide data server 618. The program guide database 616 stores electronic files of program guide data which is used to generate an electronic or interactive program guide (or, "program guide").

Program guide data can include a program title, program broadcast day(s) to identify which days of the week the program will be broadcast, program start times(s) to identify a time that the program will be broadcast on the particular day or days of the week, and a program category. Additionally, program guide data may include video on-demand content information, such as movie schedules, as well as application information, such as for interactive games, and other programming information that may be of interest to a viewer.

The program guide data server 618 processes the program guide data prior to distribution to generate a published version of the program guide data which can contain programming information for all broadcast channels and on-demand content listings for one or more days. The processing may involve any number of techniques to reduce, modify, or enhance the program data such as data compression, format modification, and the like. The program guide data server 618 controls distribution of the published version of the program guide data from a program guide data provider 604 to the content distribution system 606 using, for example, a file transfer protocol (FTP) over a TCP/IP network (e.g., Internet or Intranet). Further, the published version of the program guide data can be transmitted from program data provider 604 via a satellite and the content distribution system 606 directly to a client device 608.

Content distribution system 606 is representative of a headend service and/or program data center that provides program guide data, as well as content, to multiple subscribers (e.g., client devices 608). Each content distribution system 606 may receive a different version of the program guide data that takes into account different programming preferences and lineups. The program guide data server 618 can create different versions of the program guide data that includes those channels of relevance to respective headend services, and the content distribution system 606 transmits the program guide data to the multiple client devices 608. In one implementation, for example, content distribution system 606 utilizes a carousel file system to repeatedly broadcast the program guide data over an out-of-band (OOB) channel to the client devices 608. Alternatively, the multiple client devices 608 can receive standard, or uniform, program guide data and individually determine which program guide data to display based on the associated headend service.

Content distribution system 606 includes a broadcast transmitter 620, one or more content processing applications 622, and one or more program guide data processing applications 624. Broadcast transmitter 620 broadcasts signals, such as cable television signals, across broadcast network 610. Broadcast network 610 can include a cable television network, RF, microwave, satellite, and/or data network, such as the Internet, and may also include wired or wireless transmission media using any broadcast format or broadcast protocol. Additionally, broadcast network 610 can be any type of network, using any type of network topology and any network communication protocol, and can be represented or otherwise implemented as a combination of two or more networks.

A content processing application 622 processes the content received from a content provider 602 prior to transmitting the content across broadcast network 610. Similarly, a program guide data processing application 624 processes the program guide data received from a program guide data provider 604 prior to transmitting the program guide data across broadcast network 610. A particular content processing application 622 may encode, or otherwise process, the received content into a format that is understood by the multiple client devices 608 which are coupled to broadcast network 610. Although FIG. 6 shows a single content provider 602, a single program guide data provider 604, and a single content distribution system 606, exemplary system 600 can include any number of content providers and/or program guide data providers coupled to any number of content distribution systems.

Client devices 608 can be implemented in a number of ways. For example, a client device 608(1) receives broadcast content from a satellite-based transmitter via a satellite dish 626. Client device 608(1) is also referred to as a set-top box or a satellite receiving device. Client device 608(1) is coupled to a television 628(1) for presenting the content received by the client device (e.g., audio data, video data, and image data), as well as a graphical user interface. A particular client device 608 can be coupled to any number of televisions 628 and/or similar devices that can be implemented to display or otherwise render content. Similarly, any number of client devices 608 can be coupled to a single television 628.

Client device 608(2) is also coupled to receive broadcast content from broadcast network 610 and provide the received content to associated television 628(2). Client device 608(N) is an example of a combination television 630 and integrated set-top box 632. In this example, the various components and functionality of the set-top box are integrated into the television, rather than using two separate devices. The set-top box integrated into the television can receive broadcast signals via a satellite dish (similar to satellite dish 626) and/or via broadcast network 610. In alternate implementations, client devices 608 may receive broadcast signals via the Internet or any other broadcast medium, such as back channel 634 which can be implemented as a Internet protocol (IP) connection or as other protocol connections using a modem connection and conventional telephone line, for example. Further, back channel 634 provides an alternate communication link between each of the client devices 608, and between the client devices 608 and the content distribution system 606.

The exemplary system 100 also includes stored on-demand content 636, such as Video On-Demand (VOD) movie content. The stored on-demand content 636 can be viewed with a television 628 via a client device 608 through an onscreen movie guide, for example, and a viewer can enter instructions to stream a particular movie, or other stored content, to a corresponding client device 608.

Although the invention has been described in language specific to structural features and/or methods, it is to be understood that the invention defined in the appended claims is not necessarily limited to the specific features or methods described. Rather, the specific features and methods are disclosed as exemplary implementations of the claimed invention.

The inventiom claimed is:

1. An image processing system, comprising:
   a memory component configured to maintain image data formatted for on-screen display, the image data corresponding to an image;
   an application program configured to partition the image to generate a grid of graphic elements that each correspond to a section of the image, the application program further configured to encode the image data for each graphic element as one or more MPEG macroblocks in an MPEG frame; and
   a decoder configured to decode the MPEG frame to generate the image for display as an MPEG image, the decoder further configured to decode additional MPEG frames to scroll at least a portion of the image being displayed.

2. An image processing system as recited in claim 1, further comprising one or more processors configured to generate an on-screen image for display over the MPEG image.

3. An image processing system as recited in claim 1, further comprising one or more processors configured to generate an on-screen graphic for display over the MPEG image.

4. An image processing system as recited in claim 1, further comprising one or more processors configured to generate on-screen text for display over the MPEG image.

5. An image processing system as recited in claim 1, further comprising one or more processors configured to generate on-screen text for display over a selectable control, and wherein the decoder is further configured to decode the MPEG frame to generate the selectable control as the MPEG image.

6. An image processing system as recited in claim 1, wherein the decoder is further configured to decode the MPEG frame to generate a graphical user interface as the MPEG image.

7. An image processing system as recited in claim 1, wherein the decoder is further configured to:
   decode the MPEG frame to generate a graphical user interface having an inset section as the MPEG image; and
   decode the additional MPEG frames to scroll the inset section.

8. A client device in a television-based system comprising the image processing system recited in claim 1.

9. A digital video recorder comprising the image processing system recited in claim 1.

10. An image processing system, comprising:
    an application program configured to partition an image into a grid of graphic elements that each correspond to a section of the image, the application program further configured to generate MPEG frames that include MPEG macroblocks encoded from on-screen display image data for the graphic elements that each correspond to a section of the image represented by the on-screen display image data;
a decoder configured to decode the MPEG frames to generate MPEG image data; and
a graphics processor configured to process the MPEG image data to generate the image for display as an MPEG image and to scroll at least a portion of the image being displayed, the graphics processor further configured to process additional on-screen display image data to generate an on-screen image for display over the MPEG image.

11. An image processing system as recited in claim 10, wherein the graphics processor is further configured to:
generate a graphical user interface as the MPEG image; and
generate on-screen text for display over the graphical user interface.

12. An image processing system as recited in claim 10, wherein the graphics processor is further configured to:
generate a graphical user interface as the MPEG image; and
generate an on-screen graphic for display over the graphical user interface.

13. An image processing system as recited in claim 11, wherein the graphics processor is further configured to
generate a graphical user interface with a selectable control as the MPEG image; and
generate on-screen text for display over the selectable control.

14. An image processing system as recited in claim 10, wherein the graphics processor is further configured to:
generate a graphical user interface with multiple selectable controls as the MPEG image; and
generate on-screen text for display over at least one of the multiple selectable controls.

15. An image processing system as recited in claim 10, wherein the graphics processor is further configured to:
generate a graphical user interface with a selectable control as the MPEG image; and
generate onscreen text and an onscreen graphic for display over the graphical user interface.

16. A client device in a television-based system comprising the image processing system recited in claim 10.

17. A digital video recorder comprising the image processing system recited in claim 10.

18. A method, comprising:
receiving image data formatted for on-screen display, the image data corresponding to an image;
partitioning the image into a grid of graphic elements that each correspond to a section of the image;
encoding the image data for each graphic element as one or more MPEG macroblocks in an MPEG frame;
decoding the MPEG frame to generate the image for display as an MPEG image; and
decoding additional MPEG frames to scroll at least a portion of the image being displayed.

19. A method as recited in claim 18, further comprising:
receiving additional image data formatted for on-screen display; and
processing the additional image data to generate an on-screen image for display over the MPEG image.

20. A method as recited in claim 18, further comprising:
receiving additional image data formatted for on-screen display; and
processing the additional image data to generate an on-screen graphic for display over the MPEG image.

21. A method as recited in claim 18, further comprising:
receiving additional image data formatted for on-screen display; and
processing the additional image data to generate on-screen text for display over the MPEG image.

22. A method as recited in claim 18, wherein decoding includes decoding the MPEG frame to generate a graphical user interface as the MPEG image.

23. A method as recited in claim 22, further comprising processing additional image data to generate an on-screen image for display over the graphical user interface.

24. A method as recited in claim 22, further comprising processing additional image data to generate on-screen text for display over the graphical user interface.

25. A method as recited in claim 22, further comprising processing additional image data to generate on-screen text for display over a selectable control of the graphical user interface.

26. One or more computer-readable storage media comprising computer-executable instructions that, when executed, direct a client device in a television-based system to perform the method of claim 22.

27. A method as recited in claim 18, wherein decoding includes decoding the MPEG frame to generate a graphical user interface having an inset section as the MPEG image, and further decoding the additional MPEG frames to scroll the inset section.

28. One or more computer-readable storage media comprising computer-executable instructions that, when executed, direct a client device in a television-based system to perform the method of claim 18.

29. A method, comprising:
partitioning an image into a grid of graphic elements that each correspond to a section of the image;
generating MPEG frames that include MPEG macroblocks encoded from on-screen display image data for the graphic elements that each correspond to a section of the image represented by the on-screen display image data;
decoding the MPEG frames to generate MPEG image data;
processing the MPEG image data to generate the image for display as an MPEG image and to scroll at least a portion of the image being displayed; and
processing additional on-screen display image data to generate an on-screen image for display over the MPEG image.

30. A method as recited in claim 29, wherein processing the MPEG image data includes generating a graphical user interface as the MPEG image, and wherein processing the additional on-screen display image data includes generating on-screen text as the on-screen image for display over the graphical user interface.

31. A method as recited in claim 29, wherein processing the MPEG image data includes generating a graphical user interface as the MPEG image, and wherein processing the additional on-screen display image data includes generating an on-screen graphic as the on-screen image for display over the graphical user interface.

32. A method as recited in claim 29, wherein processing the MPEG image data includes generating a graphical user interface with a selectable control as the MPEG image, and wherein processing the additional on-screen display image data includes generating on-screen text as the on-screen image for display over the selectable control.

33. A method as recited in claim 29, wherein processing the MPEG image data includes generating a graphical user interface with multiple selectable controls as the MPEG image, and wherein processing the additional on-screen display image data includes generating on-screen text for display over at least one of the multiple selectable controls.

34. A method as recited in claim 29, wherein processing the MPEG image data includes generating a graphical user interface with a selectable control as the MPEG image, and wherein processing the additional on-screen display image data includes generating on-screen text and an on-screen graphic for display over the graphical user interface.

35. One or more computer-readable storage media comprising computer-executable instructions that, when executed, direct a client device in a television-based system to perform the method of claim 29.

36. One or more computer-readable storage media comprising computer-executable instructions that, when executed, direct a client device to:
partition an image into a grid of graphic elements that each correspond to a section of the image;
generate MPEG image data from on-screen display image data for the graphic elements, the MPEG image data including MPEG macroblocks corresponding to the graphic elements that each represent a section of the image; and
decode the MPEG image data to generate a graphical user interface for display as an MPEG image, the graphical user interface having one or more selectable controls, and further decode the MPEG image data to scroll at least a portion of the graphical user interface.

37. One or more computer-readable storage media as recited in claim 36, further comprising computer executable instructions that, when executed, direct the client device to process additional on-screen display image data to generate on-screen text for display over the graphical user interface.

38. One or more computer-readable storage media as recited in claim 36, further comprising computer executable instructions that, when executed, direct the client device to process additional on-screen display image data to generate on-screen text for display over at least one of the selectable controls on the graphical user interface.

39. One or more computer-readable storage media as recited in claim 36, further comprising computer executable instructions that, when executed, direct the client device to process additional on-screen display image data to generate an on-screen graphic for display over the graphical user interface.

40. One or more computer-readable storage media as recited in claim 36, further comprising computer executable instructions that, when executed, direct the client device to further decode the MPEG image data to scroll an inset section of the graphical user interface.

* * * * *